United States Patent
Rath et al.

(10) Patent No.: US 11,853,170 B2
(45) Date of Patent: Dec. 26, 2023

(54) METHOD TO PREVENT BACKUP FAILURES WHEN THE BACKUP SERVER STORAGE UTILIZATION IS FULL OR NEARLY FULL

(71) Applicant: EMC IP Holding Company LLC, Hopkinton, MA (US)

(72) Inventors: Jagannathdas Rath, Bengaluru (IN); Kalyan C. Gunda, Bengaluru (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/192,584

(22) Filed: Mar. 4, 2021

(65) Prior Publication Data

US 2022/0283908 A1   Sep. 8, 2022

(51) Int. Cl.
  *G06F 3/00*     (2006.01)
  *G06F 11/14*    (2006.01)
  *G06F 11/30*    (2006.01)
  *G06F 3/06*     (2006.01)

(52) U.S. Cl.
  CPC .......... *G06F 11/1464* (2013.01); *G06F 3/065* (2013.01); *G06F 3/0619* (2013.01); *G06F 3/0634* (2013.01); *G06F 3/0683* (2013.01); *G06F 11/3034* (2013.01)

(58) Field of Classification Search
  None
  See application file for complete search history.

(56) References Cited

U.S. PATENT DOCUMENTS

| | | | |
|---|---|---|---|
| 5,673,382 A * | 9/1997 | Cannon | G06F 11/1464 714/15 |
| 10,108,626 B2 * | 10/2018 | Charania | G06F 16/162 |
| 2021/0216206 A1 * | 7/2021 | Liu | G06F 3/0659 |

* cited by examiner

*Primary Examiner* — Midys Rojas
(74) *Attorney, Agent, or Firm* — WOMBLE BOND DICKINSON (US) LLP (57) ABSTRACT

A method, system and computer-readable storage medium for data backup by a backup server having local storage. In normal mode of operation the backup server stores any ingest data in the local storage. A redirect monitor continuously monitors the capacity utilization of the local storage. When the capacity utilization surpasses a preset threshold, the backup server is switched to operate in redirect mode, where newly received ingest data is redirected to alternate storage. The alternate storage may be, e.g., cloud storage or storage as a service facility. Thereafter the redirect monitor checks the utilization of the local storage and if that drops below a preset safety margin, the backup server reverts to normal operating mode. The backup server may or may not copy all redirected data from the alternate storage to the local storage, depending on the setup.

17 Claims, 3 Drawing Sheets

METHOD TO PREVENT BACKUP FAILURES WHEN THE BACKUP SERVER STORAGE UTILIZATION IS FULL OR NEARLY FULL

TECHNOLOGICAL FIELD

The present disclosure relates generally to data backup operations, and in particular, to preventing backup failure when the storage reaches maximum capacity.

BACKGROUND

Backup applications like PPDM, Avamar, Networker, Netbackup etc. have pre-defined backup policies and schedules and have their backup agents running in numerous client systems to backup various kinds of data like filesystems, databases, virtual machines, job workloads, etc., based on pre-scheduled time durations or similar policies. These backup applications are generally configured and connected to backup servers to store/archive the backup data/files. These backup servers might be regular/non-dedupe storage servers or dedupe servers like DD (DataDomain™) and data is generally sent to them via various protocols like NFS, CIFS or DSP clients etc. (Ex. DDBoost Client provided by DD).

Ingesting new data to dedupe servers includes backup application or clients sending the whole data to the dedupe server, which then processes the data by segmenting, fingerprinting the segments, identifying the unique and non-unique segments and finally writing only the new and unique segments to the disks while the non-unique segments are simply deduped to the existing segments. Alternatively, using DSP (Distributed Segment Processing) clients where only the unique segments are sent to the dedupe servers to be written on disks. Ingesting data to non-dedupe servers includes backup apps/clients sending the complete files in a backup job to the backup server every time and each file is then written fully on disks.

In real deployments, one or more backup applications are connected to such backup servers, and constantly backing up data from hundreds and thousands of clients. These backups are done as per defined schedules, policies or even manually triggered, over different span of time. These processes proceed normally as long as there is enough storage space in the backup server to accommodate the new data. However, if the storage capacity utilization in the backup server goes to 100% or near to 100% such that it won't be able to accommodate the next incoming backups, a failure occurs creating a chain of problems.

When a backup process fails, the failed backups would leave behind broken backup images in the server. Consequently, the administrators need to trace these broken backup images and remove them manually. Also, retrying failed backups generally requires manual intervention, In such cases the broken backups need to be cleaned up first in the server and the backup server capacity needs to be increased by adding more disks or expiring (deleting or moving) old backup data. Then the retry of the backup job can be initiated for each failed job.

In cases where the backup application supports auto retry of failed backups, then it might require the administrator's intervention to pause (if possible) the auto retry until the capacity is increased in the backup server. Otherwise, all retries are going to fail eventually and all these failed retries would leaving behind numerous more broken backup images in the backup server.

Moreover, before the capacity is increased or freed up in the backup server, the next scheduled backup job in line might have already started, not knowing that earlier backup has failed. The next scheduled backup would also eventually fail, and so on leading to a series of such failures. As a result, the administrator's overhead increases drastically to cleanup these broken backups and retry these failed backup jobs one-by-one once the capacity is increased in the backup server.

Multiple backup applications generally backup their data to one backup server, and multiple such setups might exist in the backup infrastructure environment. Therefore, all of the above noted problems would happen in a more intensified manner, thus requiring lots of administrators' management and overhead. Also, in such setups, even though there might be enough space for few backup jobs (when done sequentially), but as multiple backup jobs might start at the same time from different backup applications, ingesting data in parallel, this space will be partially utilized by all the backup jobs, eventually filling up the backup server with partial backup data leading to failure of all backup jobs.

BRIEF DESCRIPTION OF THE DRAWING(S)

Embodiments of the invention are illustrated by way of example and not limitation in the figures of the accompanying drawings in which like references indicate similar elements. Reference will now be made to the accompanying drawings, which are not necessarily drawn to scale, and wherein.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In some example implementations an efficient method to avoid failure during a backup process is provided for cases wherein the backup server runs out of space. Disclosed embodiments introduce a temporary bypass enabling continuation of the backup operation even when the backup server has reached its maximum capacity. The disclosed embodiment avoid the cleanup and restart processes that are generally required after a backup failure.

In this respect, while the embodiments are described in terms of backup server or storage server, the invention disclosed herein is applicable to any storage system or appliance that accepts data for storage and when the storage space is full the storage write operation fails. By implementation of the disclosed embodiments, rather than the storage write operation failing, the write operation would be performed temporarily to an alternate storage facility.

Most backup servers now support cloud storage for long term retention of the backup data. They generally move the backed-up data to the cloud based on factors like age, importance etc. They may also support other forms of remote storage, such as storage as a service. Various embodiments and examples disclosed herein take advantage of such alternate storage availability, such as cloud storage, to temporarily store some of the incoming backup data when the local capacity has no space left or is about to get filled. In that way, it will ensure that the backup jobs will never fail. Consequently, administrators would not have to unnecessarily waste time in cleaning up broken backup data, retrying failed backup jobs, etc.

According to embodiments and examples disclosed herein, upon determining that insufficient storage space is available in the backup server, the process temporarily places the backup server in a redirection mode to thereby redirect the new ingest data to alternate storage, e.g., cloud storage, directly. Once the local storage capacity is increased by adding disks or freeing up space, then the server would go back to normal mode and the redirected data will be recalled back to local storage and deleted from the cloud storage. The backup policy can be defined by backup server to even let the redirected data to stay in cloud as well.

It will therefore be appreciated that the above brief summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

Some implementations of the present disclosure will now be described more fully hereinafter with reference to the accompanying drawings, in which some, but not all, implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

Example implementations of the present disclosure are generally directed to backup operations, and in particular, to backup operations wherein data is transferred from a backup client to a backup server for storage.

Figure 1:
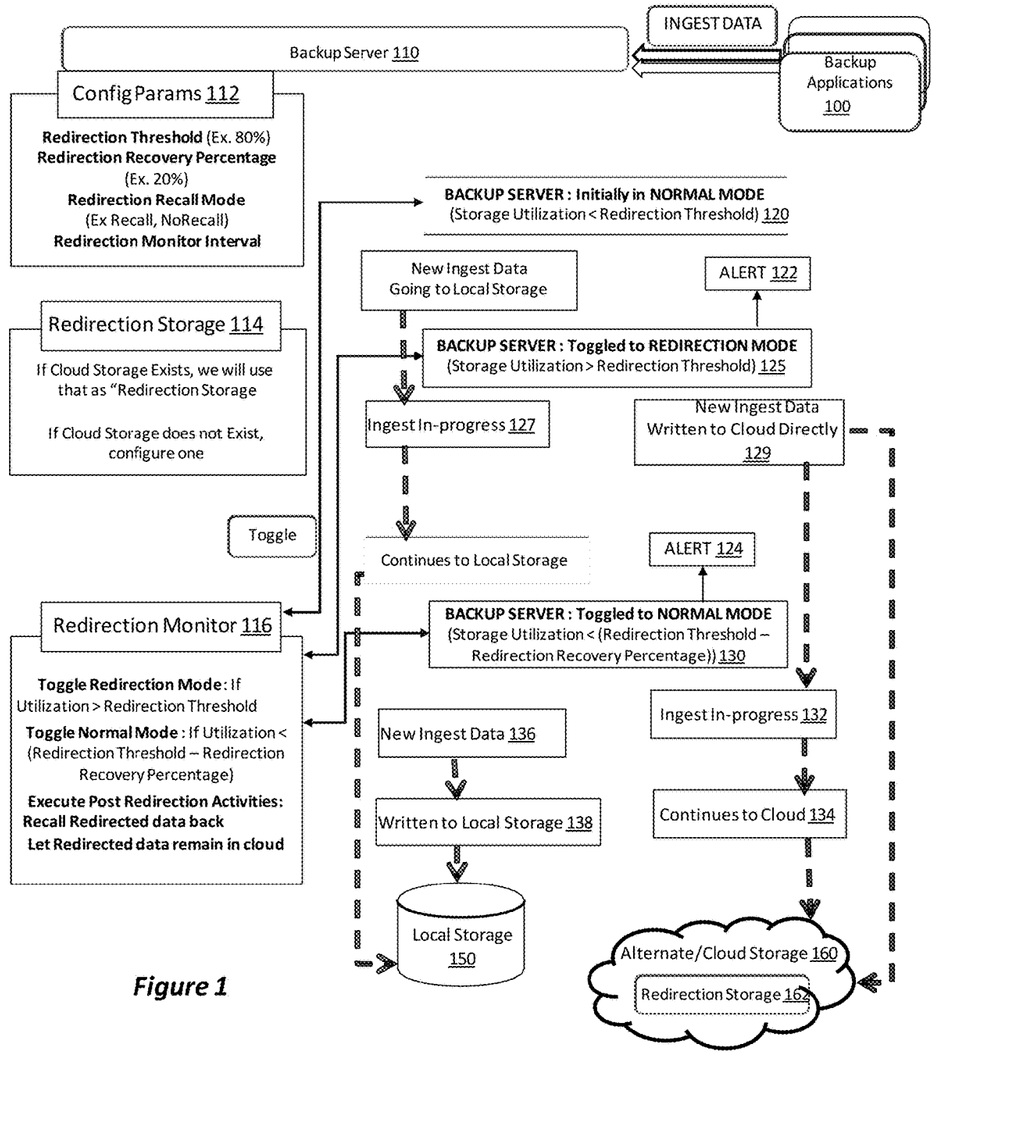
FIG. 1 illustrates a process for performing backup operations for data, according to example implementations of the present disclosure.

FIG. 1 illustrates a process flow according to an embodiment. The backup applications 100 operate in coordination with the backup server 110 to execute backup processes on clients data. Box 112 indicates configuration parameters that may be controllable in the backup server 110, while box 114 indicates alternatives for redirection of data. Box 116 indicates setups for redirection monitor that may operate within the backup server 110.

Regarding the configuration parameters, box 112, the following configuration values may be set in the backup server 110, according to this example. A redirection monitor interval can be used to set the interval between a storage monitoring checks. During each check, the redirection monitor compares the storage utilization of the local storage with a preset threshold to determine whether to change the backup server 110 to a redirection mode of operation. The redirection threshold can be set to indicate the utilization percentage of the on-premises, i.e., local storage capacity. When the backup server 110 passes this threshold, the redirection mode of operation will be triggered.

A redirection recovery percentage indicates the amount the utilization should drop for triggering a return to normal mode of operation. The redirection recovery percentage can be defined to an amount below the redirection threshold. For example, the redirection threshold can be set at 90% capacity and the redirection recovery percentage can be set to 20% available capacity. The utilization here again refers to the local storage only, since when new disks are added or old files deleted the utilization percentage would change even if no new data has been added. When space availability in the local storage increases, such as by addition of disks or deletion/move of old data, there may be no need to continue redirecting newly ingested data.

A post redirection action indicates whether the data moved to the alternate storage during redirection mode shall be recalled back to local storage or allowed to remain there, or any other action. This parameter may also be identified by a Boolean value that indicates either recall or no recall, or a string values if there are more actions.

With respect to box 114, the backup servers 110 generally support configuring cloud storage for data movement. When the backup server 110 already supports cloud storage, the process uses the associated cloud bucket or container as a temporary redirection storage. If no bucket or containers are created yet, then one is created upon switching to redirection mode or even much before, as per the backup server's defined process, especially to act as redirection storage. If the backup server 110 does not support cloud storage, then according to this embodiment the ability to configure cloud storage in the backup server (Ex. CLI (command line interface), GUI (graphic user interface) and I/O Path) is added, so that the backup server 110 should be able to write and read data in the cloud. Once cloud storage is configured in the backup server 110, the configured bucket or container will be used as redirection storage. According to one example, a special directory will be created in the bucket or container to store the redirected data, e.g., /redirected_storage_dir/.

According to embodiments disclosed herein, the backup server 110 operates in two modes of operation: a normal mode and a redirection mode. The normal mode is the default mode and is similar to the standard backup operation wherein the backup server receives the ingested data and stores it on disk, i.e., local storage. In redirection mode the backup server receives the ingested data but rather than storing it on disk, it sends the data to an alternate storage, e.g., the cloud, i.e., remote storage. According to one example, selecting between the two-modes of operation is accomplished by running an independent process as a daemon, that is referred to herein as redirection monitor 116, which periodically checks for the local storage utilization.

The check is performed according to the period configured via the redirection monitor interval indicated above.

As illustrated in FIG. 1, the backup server 110 initially operates in normal mode (box 120), wherein new ingest data is stored in local storage 150. The normal mode may be the default mode of the backup server. Whenever storage utilization in local storage 150 goes beyond the redirection threshold, (e.g., say 90%), the redirection monitor 116 would place the backup server in redirection mode (box 125) and all new ingests from that point of time will be redirected to the configured alternate storage (box 129), e.g., provisioned cloud storage 160. New ingests can be detected by various methods specific to the backup server 110, e.g., after redirection mode is enabled any new files opened for write or new streams opened for write are all new ingests and will go to cloud 160.

According to an example, once the redirection mode is activated, the method will raise alerts or notifications in the backup server (box 122). Any configured emails, SMS or SNMP traps, etc., may also get triggered in this alert process. In one example the alerts will be raised recurrently every pre-configured duration, e.g., every 6 hours, daily etc., until the redirection mode is no longer active.

As illustrated by box 127, the ongoing ingests at the time of the switch to redirection mode will be allowed to continue going to the local storage 150, to ensure that all of their data remain at one place. If the redirection threshold was configured properly, the probability of all the ongoing ingests spanning across the 100% utilization of the local storage 150 would be very low. Conversely, if that actually happens, then the redirection threshold should be reconfigured by adjusting to a lower value, e.g., 80% instead of 90%.

As indicated by box 129, newly ingested data will be written to the cloud bucket 162 directly from the backup server 110, and would be marked as redirected data. The marking is done so that the backup server can easily identify and move the redirected data back from the cloud to the local storage 150 as and when needed, without disturbing other co-located data in the alternate/cloud 160. In one embodiment the marking will involve storing appropriate flags in the metadata of the ingested files or cloud objects or anywhere else as deemed appropriate by the backup server, to indicate the location of the redirected data. The writes to alternate/cloud storage 160 may be done as defined by the backup server 110 (I/O path will be specific to each backup server).

Once in redirection mode, the redirection monitor 116 would be constantly monitoring, at regular intervals, to check if the utilization at the local storage has fallen below the redirection threshold by at least the redirection recovery percentage amount (e.g., by an administrator adding disks or removing old files to free more storage space). If it has, then the monitor will toggle the backup server to normal mode. This is generally expected to happen when the administrators intervene and add more disks or free up space in the backup server.

Once the capacity of local storage 150 is freed up by expiring and deleting old backups or increased by adding new disks to the backup server 110, the redirection mode would be toggled back (box 130) to normal mode by the redirection monitor 116. In one example, the toggle would also raise an alerts and notifications, but only once. According to an optional embodiment, upon adding more disks or free up space the administrator may manually force reverting to normal mode of operation, since if not enough free space has been added, the redirection monitor would automatically return the backup server to redirection mode. The alternative manual option may be implemented in addition or instead of the redirection monitor checking for potential return to normal mode.

Once the normal mode is toggled back, the new ingests will again be stored in the local storage 150. If any ongoing ingests, initiated during the redirection mode, are still in progress (box 132), they will continue until completion and their data will continue to get redirected (box 134) to alternate/cloud storage 160. Conversely, any new ingest data (box 136) will be written to the local storage 150 (box 138).

After toggling back to normal mode, the redirection monitor 116 checks the amount of redirected data written to cloud directly under redirection mode and see if the data can be recalled back now to the local storage 150. Specifically, in one embodiment the process executed by the redirection monitor 116 after the toggle back to normal mode can be controlled by presetting the post redirection action config option. For example, the post redirection action may include a Boolean having recall or no recall values. If the value is configured as "recall", then the redirection monitor will trigger an independent process to ensure that redirected data from the redirection storage 162 is moved back to local storage 150 (only if sufficient space is available locally), and deletes the data from the redirection storage 162 once the recall is completed. Conversely, if the value is configured as "no recall", then nothing will be done by the redirection monitor 116 and the redirected data will remain in the redirection storage 162. Of course, other actions may be configured as preferred by the administrator.

According to an embodiment, appropriate CLIs may be provided to allow the administrators to manually recall the redirected data from redirection storage 162 to the local storage 150 at a later date as needed. The CLIs could be configured to eventually trigger the same independent process as detailed above to start the recall process. Also, the recall process should be configured to ensure that bringing back the data does not trigger redirection mode again. Therefore, according to an embodiment, prior to initiating the recall process, the process checks that there is enough capacity in the local storage 150 to hold the moved data and have sufficient capacity left for future ingests as well. The capacity amount may be preset as a parameter by the administrators.

The above examples use cloud storage as a redirection storage for temporarily storing the ingest data; however, this is just one of the choices that may be employed for the alternate storage. Other embodiments may choose any other viable and feasible mode of storage for redirecting ingested data. For example, according to another embodiment the process may be preconfigured to temporarily spawn a new storage subscription in any form like S3 (Amazon Simple Storage Service), Network Block storage, NFS (Network File System), CIFS (Common Internet File System) etc., and moved the redirected data to that provisioned alternate storage. Once the redirection mode is toggled back to normal mode, the data may be recalled back as per the above examples, and the storage may be de-provisioned. The ingested data can also be redirected to a separate NFS or CIFS share that may be supported by the backup server 110, or even to another backup server having sufficient capacity.

Figure 2:
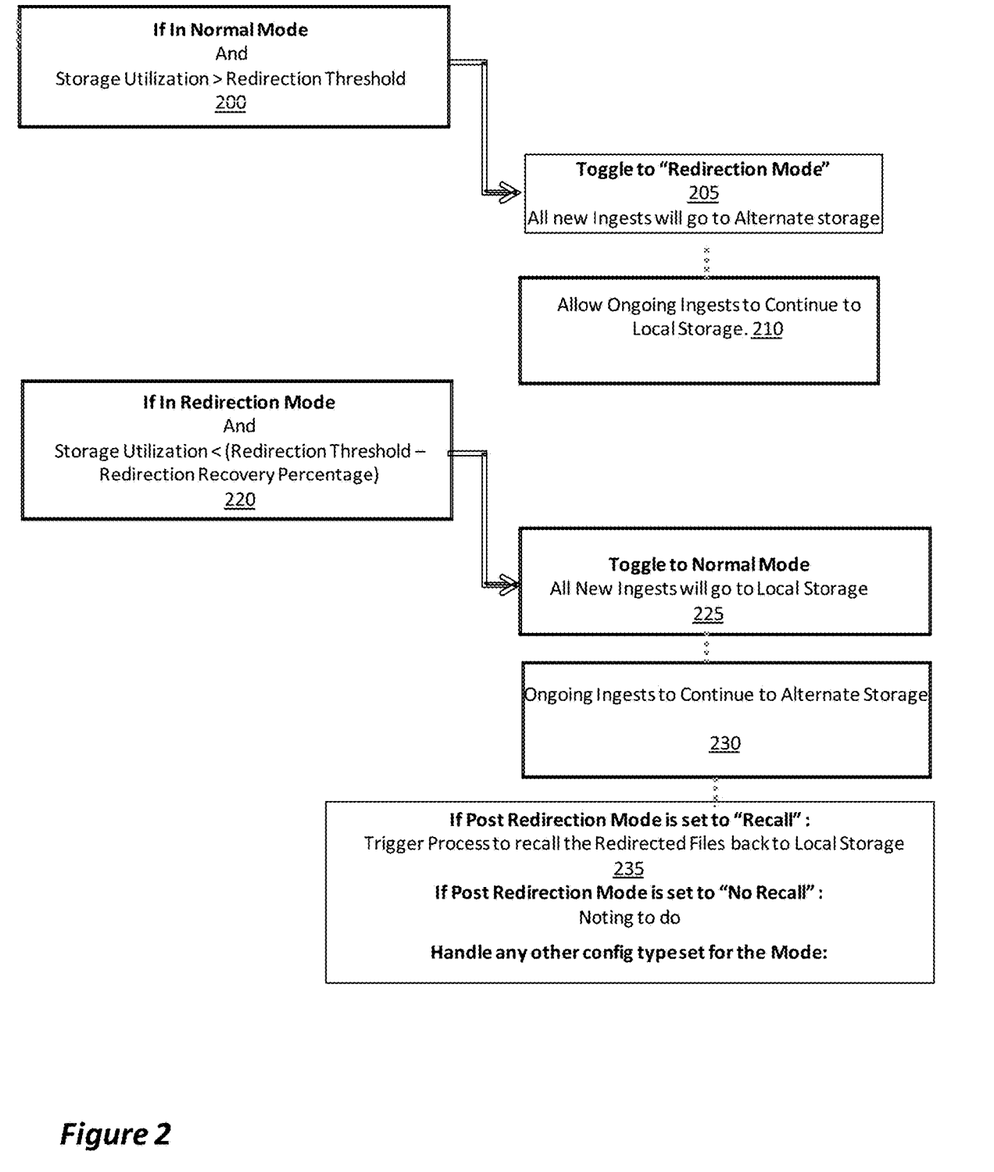
FIG. 2 illustrates a process for redirection monitor, according to example implementations of the present disclosure; and, FIG. 3 illustrates an apparatus according to example implementations of the present disclosure.

FIG. 2 illustrates a process to be executed by the redirection monitor according to an embodiment. The redirection monitor may be executed within the backup server to continuously monitor the storage utilization due to backup operations. When the backup server is operating in normal mode and the redirection monitor detects that the local storage utilization surpasses the redirection threshold (box

200), the redirection monitor toggles the backup server to redirection mode (box 205). From this point onward, all new ingests will be redirected to alternate storage. The alternate storage may be redirect to the cloud, or using storage as a service, or other options as disclosed above. Conversely, ongoing ingests will continue to be stored in the local storage, so as to keep the files complete in the local storage.

On the other hand, when the backup server operates in a redirection mode and the redirection monitor determines that the storage utilization of the local storage is below the redirection threshold minus a redirection recovery percentage (box 220), the redirection monitor toggle the storage server back to normal operating mode (box 225). From this point onward all new ingest data would be stored to the local storage. Conversely, all ongoing ingests at the time of the toggle back to normal mode will continue to be directed to the alternate storage (box 230). Then, at 235, if the post redirection action is set to recall, the process to recall the files from the alternate storage to the local storage is triggered. Conversely, if the post redirection action is set to no-recall, the backup server does not move the data from the alternate storage to the local storage. Similarly, if any other post redirection action is configured, then that will be triggered here.

By the above disclosure, an efficient mechanism to prevent backup jobs from failing and ensuring that the backups happen as scheduled is provided. The disclosed embodiments intelligently use cloud storage or any other alternate storage, e.g., network storage or storage as service subscriptions, or even another backup server, to temporarily store the ingest data from the backup jobs for a brief period of time, after which the data can be recalled back to the local storage. The disclosed mechanism is operable for both backup apps supporting cloud storage and the ones not supporting cloud storage. Also disclosed embodiments prevent all possible chaos and management overhead for administrators, which would have been caused due to numerous failed backups. Consequently, the disclosed embodiments save a lot of time and effort and the administrators would no longer need to cleanup broken backup data from backup servers, analyze and retry failed backup jobs, etc. Notably, the disclosed embodiments are equally applicable to dedupe servers as well as non-dedupe backup servers. By implementing any of the disclosed embodiments, possible backup failures are intelligently handled in the backup server itself, and the backup apps or clients neither know about it nor need to do anything specific in such cases.

The disclosed embodiments thus provide a method of alternatingly operating a backup server in two modes of operation, normal mode and redirection mode, so as to avoid backup failure if the local storage reaches capacity limit. In the normal mode of operation the backup server receives ingested data and stores the data in the local storage, with or without performing dedupe. In the redirection mode, which is triggered when the capacity utilization of the local storage surpasses a preset threshold, the backup server redirects any new ingested data to an alternate storage, such as cloud storage, storage as a service, etc. The alternate storage may be provisioned beforehand or may provisioned upon detecting that the utilization capacity of the local storage surpasses the preset threshold.

Thus, a method of performing data backup operations from a client to a storage server having a local storage is disclosed, comprising: setting up a redirection threshold; operating the storage server in normal mode, wherein ingest data is stored in the local storage; continuously monitoring capacity utilization of the local storage; and when the capacity utilization surpasses the redirection threshold, operating the storage server in redirection mode, wherein ongoing ingest data is stored in the local storage and new ingest data is redirected to alternate storage, remote from the local storage. The method may further comprise continuously monitoring storage utilization of the local storage and, when storage utilization of local storage drops below a predetermined recovery threshold, reverting the storage server to normal operating mode while continuing to redirect ongoing ingest data to the alternate storage. The recovery threshold may equal the redirection threshold less a preset safety margin amount. Upon reverting the storage server to normal operating mode, the method may proceed to copy all redirected data from the alternate storage to the local storage. Alternatively, the method may include setting a post redirection action value and upon reverting the storage server to normal operating mode, determining whether to copy all redirected data from the alternate storage to the local storage based on the post redirection action value.

Disclosed embodiments also enable a computing system for performing backup operations of data of a client by a backup server having a local storage, the system comprising a processor and a memory storing executable instructions that, in response to execution by the processor, cause the system to perform the steps comprising: setting a redirection threshold; setting a normal mode of operation for the backup server, wherein new ingest data is stored by the backup server in the local storage; setting a redirect mode of operation for the backup server, wherein new ingest data is redirected by the backup server to an alternate storage, different from the local storage; operating the storage server in normal mode; setting a redirection monitor that continuously monitors capacity utilization of the local storage and compares the capacity utilization to the redirection threshold; and, when the capacity utilization surpasses the redirection threshold, switching the backup server to operate in redirect mode. Also, upon switching to redirect mode, operating the backup server to store ongoing ingest data in the local storage and/or after switching the backup server to redirect mode, repeatedly issuing an alert until the backup server reverts to normal mode of operation.

After switching the backup server to redirect mode, the system to perform the steps operating the redirection monitor to continuously monitor storage utilization of the local storage and when the storage utilization drops below a predetermined recovery threshold, reverting the storage server to normal operating mode. After reverting the backup server to normal operating mode, operating the backup server to redirect ongoing ingest data to the alternate storage. The steps may include copying redirected data from the alternate storage to the local storage.

Furthermore, the disclosed embodiments enable a computer-readable storage medium for backup data by a backup server having a local storage, the computer-readable storage medium being non-transitory and having computer-readable program code stored therein that in response to execution by a processor, causes the backup server to: set a redirection threshold; set a recovery value; set a normal mode of operation for the backup server, wherein new ingest data is stored by the backup server in the local storage; set a redirect mode of operation for the backup server, wherein new ingest data is redirected by the backup server to an alternate storage, different from the local storage; operate the storage server in normal mode; set a redirection monitor that continuously monitors capacity utilization of the local storage and compares the capacity utilization to the redirection threshold; and when the capacity utilization surpasses the redirection threshold, the backup server switches to operate in redirect mode.

Upon switching to redirect mode, the backup server stores ongoing ingest data in the local storage and may issue an alert. Also, after the backup server switches to redirect mode, the redirection monitor continuously monitors storage utilization of the local storage and when the storage utilization drops below the recovery threshold, the storage server reverts to normal operating mode. After the backup server reverts to normal operating mode, the backup server may continue to redirect ongoing ingest data to the alternate storage and may copy redirected data from the alternate storage to the local storage.

Figure 3:
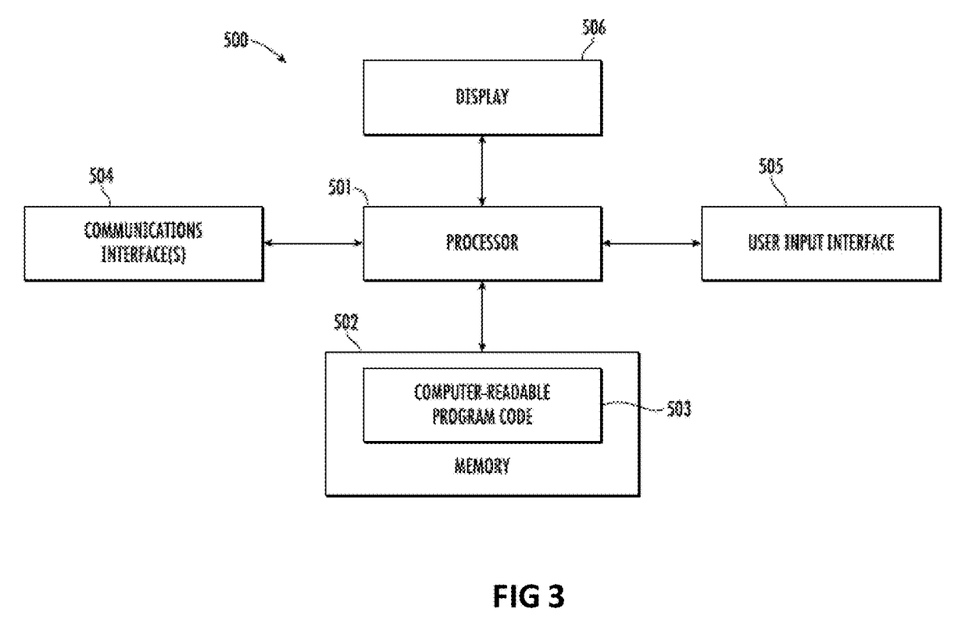

FIG. 3 illustrates an apparatus 500 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 501 (e.g., processing circuitry) connected to a memory 502 (e.g., storage device). In some examples, the apparatus 500 implements the system 100.

The processor 501 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 502 (of the same or another apparatus).

The processor 501 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 502 is generally any piece of computer hardware that is capable of storing information such as, for example, data, computer programs (e.g., computer-readable program code 503) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 502, the processor 501 may also be connected to one or more interfaces for displaying, transmitting and/or receiving information. The interfaces may include a communications interface 504 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 506 and/or one or more user input interfaces 505 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 501 and a computer-readable storage medium or memory 502 coupled to the processor, where the processor is configured to execute computer-readable program code 503 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of performing write operations for data storage from a client to a server having a local storage, comprising:
   setting up a redirection threshold;
   operating the server in normal mode, wherein ingest data is stored in the local storage;
   continuously monitoring capacity utilization of the local storage;
   when the capacity utilization surpasses the redirection threshold, operating the server in redirection mode, wherein ongoing ingest data is stored in the local storage and new ingest data is redirected to alternate storage remote from the local storage;
   continuously monitoring storage utilization of the local storage and, when storage utilization of local storage drops below a predetermined recovery threshold, reverting the server to normal operating mode while continuing to redirect ongoing ingest data to the alternate storage; and
   after reverting the server to normal operating mode copying all redirected data from the alternate storage to the local storage.

2. The method of claim 1, wherein the recovery threshold equals the redirection threshold less a preset amount.

3. The method of claim 1, wherein the alternate storage comprises one of: cloud-based storage, storage as a service, and network block storage.

4. The method of claim 1, wherein the new ingest data is redirected to alternate storage utilizing one of network file system and common internet file system protocols.

5. The method of claim 1, further comprising repeatedly issuing an alert while operating the server in redirection mode.

6. A method of performing write operations for data storage from a client to a server having a local storage, comprising:
   setting up a redirection threshold;
   operating the server in normal mode, wherein ingest data is stored in the local storage;
   continuously monitoring capacity utilization of the local storage;
   when the capacity utilization surpasses the redirection threshold, operating the server in redirection mode, wherein ongoing ingest data is stored in the local storage and new ingest data is redirected to alternate storage remote from the local storage;
   continuously monitoring storage utilization of the local storage and, when storage utilization of local storage drops below a predetermined recovery threshold, reverting the server to normal operating mode while continuing to redirect ongoing ingest data to the alternate storage; and
   setting a post redirection action value and upon reverting the server to normal operating mode, determining whether to copy all redirected data from the alternate storage to the local storage based on the post redirection action value.

7. The method of claim 6, wherein the recovery threshold equals the redirection threshold less a preset amount.

8. The method of claim 6, wherein the alternate storage comprises one of: cloud-based storage, storage as a service, and network block storage.

9. The method of claim 6, wherein the new ingest data is redirected to alternate storage utilizing one of network file system and common internet file system protocols.

10. The method of claim 6, further comprising repeatedly issuing an alert while operating the server in redirection mode.

11. A compute system for performing backup of data of a client by a backup server having a local storage, the system comprising a processor and a memory storing executable instructions that, in response to execution by the processor, cause the system to perform the steps comprising:
    setting a redirection threshold;
    setting a normal mode of operation for the backup server, wherein new ingest data is stored by the backup server in the local storage;
    setting a redirect mode of operation for the backup server, wherein new ingest data is redirected by the backup server to an alternate storage, different from the local storage;
    operating the backup server in normal mode;
    setting a redirection monitor that continuously monitors capacity utilization of the local storage and compares the capacity utilization to the redirection threshold;
    when the capacity utilization surpasses the redirection threshold, switching the backup server to operate in redirect mode;

after switching the backup server to redirect mode, operating the redirection monitor to continuously monitor storage utilization of the local storage and when the storage utilization drops below a predetermined recovery threshold, reverting the backup server to normal operating mode; and copying redirected data from the alternate storage to the local storage.

12. The system of claim 11, further comprising the steps: upon switching to redirect mode operating the backup server to store ongoing ingest data in the local storage.

13. The system of claim 12, further comprising the steps:
after switching the backup server to redirect mode, repeatedly issuing an alert.

14. The system of claim 11, further comprising the steps:
after reverting the backup server to normal operating mode, operating the backup server to redirect ongoing ingest data to the alternate storage.

15. A computer-readable storage medium for backup data by a backup server having a local storage, the computer-readable storage medium being non-transitory and having computer-readable program code stored therein that in response to execution by a processor, causes the backup server to:
set a redirection threshold;
set a recovery value;
set a normal mode of operation for the backup server, wherein new ingest data is stored by the backup server in the local storage;
set a redirect mode of operation for the backup server, wherein new ingest data is redirected by the backup server to an alternate storage, different from the local storage;
operate the backup server in normal mode;
set a redirection monitor that continuously monitors capacity utilization of the local storage and compares the capacity utilization to the redirection threshold;
when the capacity utilization surpasses the redirection threshold, the backup server switches to operate in redirect mode;
after the backup server switches to redirect mode, the redirection monitor continuously monitors storage utilization of the local storage and when the storage utilization drops below the recovery threshold, the backup server reverts to normal operating mode;
after the backup server reverts to normal operating mode, the backup server to redirect ongoing ingest data to the alternate storage; and
copying redirected data from the alternate storage to the local storage.

16. The computer-readable storage medium of claim 15, wherein upon switching to redirect mode, the backup server stores ongoing ingest data in the local storage.

17. The computer-readable storage medium of claim 16, further comprising after the backup server switches to redirect mode, the backup server repeatedly issues alerts.

* * * * *